United States Patent [19]
Griffin et al.

[11] Patent Number: 4,866,235
[45] Date of Patent: Sep. 12, 1989

[54] MICROWAVABLE CONTAINERS USEFUL FOR CONTROLLED HEATING

[75] Inventors: Don Griffin, Napa; Steven J. Nadel, Berkeley; Tamzen L. Van Skike, Concord, all of Calif.

[73] Assignee: The BOC Group, Inc., New Providence, N.J.

[21] Appl. No.: 301,516

[22] Filed: Jan. 24, 1989

[51] Int. Cl.⁴ .............................................. H05B 6/64
[52] U.S. Cl. ...................... 219/10.55 E; 219/10.55 F; 426/107; 426/234; 426/243; 99/DIG. 14
[58] Field of Search .................. 219/10.55 E, 10.55 F, 219/10.55 M, 10.55 R; 426/243, 241, 234, 107, 109, 111, 112, 113, 114; 99/DIG. 14, 451; 126/390

[56] References Cited

U.S. PATENT DOCUMENTS

| | | | |
|---|---|---|---|
| 2,856,497 | 10/1958 | Rudenberg | 219/10.55 E |
| 4,190,757 | 2/1980 | Turpin et al. | 219/10.55 E |
| 4,434,197 | 2/1984 | Petriello et al. | 426/234 X |
| 4,559,429 | 12/1985 | Holcombe | 219/10.55 F |
| 4,721,738 | 1/1988 | Ellis et al. | 523/137 |
| 4,751,358 | 6/1988 | Durand | 219/10.55 E |
| 4,775,560 | 10/1988 | Katsura et al. | 426/113 |

OTHER PUBLICATIONS

Circelli et al., "Characterization of Reactively Sputtered TiN Films", *Solid State Technology*, Feb. 1988, pp. 75–78.
Schrieber et al., "Advanced Microwavable Packaging", Report Four of Advanced Packaging Technologies 1987.

*Primary Examiner*—Philip H. Leung
*Attorney, Agent, or Firm*—David A. Draegert; Larry R. Cassett

[57] ABSTRACT

A container useful in microwave heating of foods comprises a substrate with a titanium nitride film on at least a portion of the substrate. The substrate is substantially microwave transparent except where coated with the titanium nitride film. The film is adapted to absorb microwave energy. The film thus becomes heated and transfers heat to foods when adjacent the film. This heat transfer provides crisp heating of foods, such as fried chicken, french fries and the like.

9 Claims, 1 Drawing Sheet

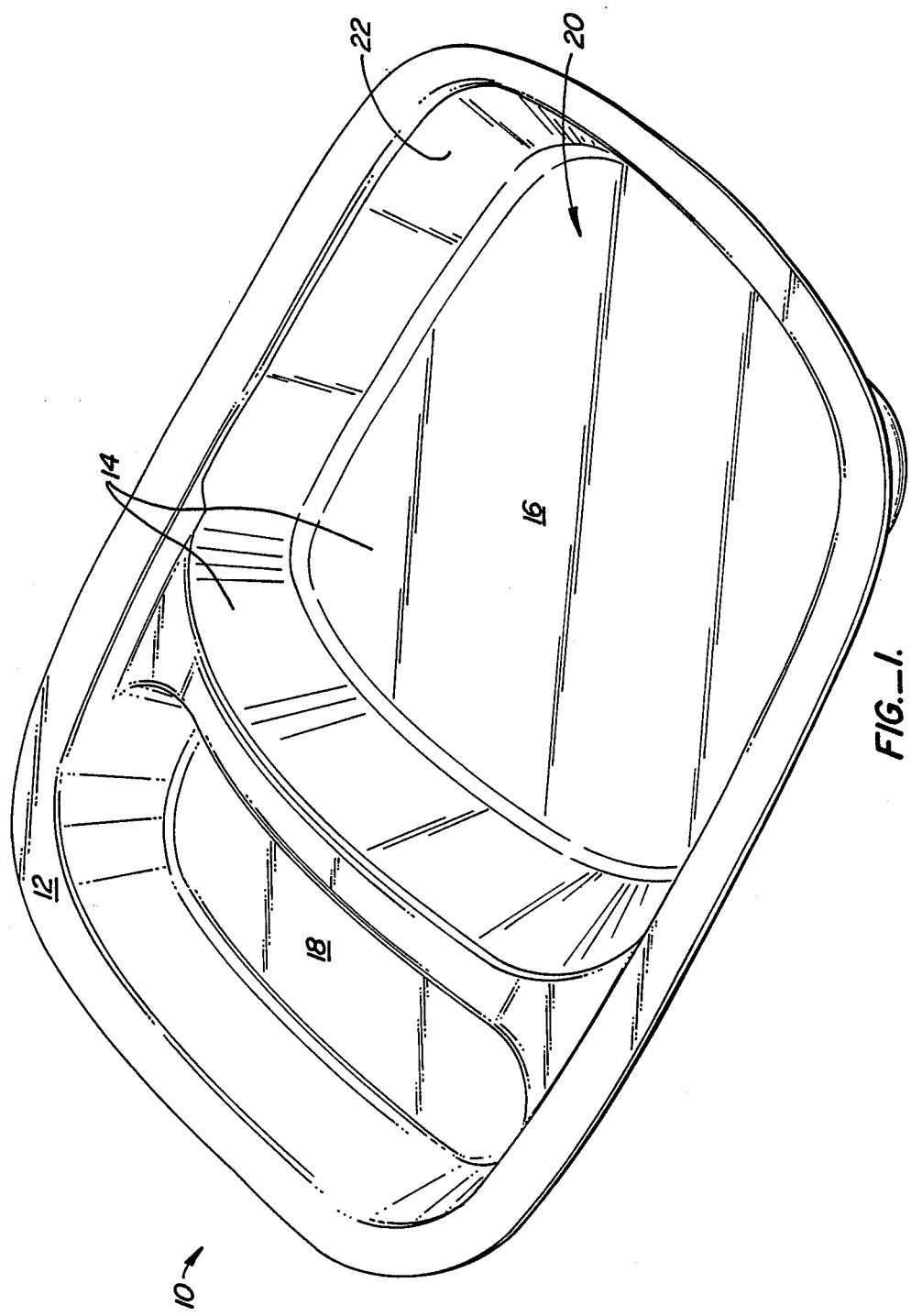

MICROWAVABLE CONTAINERS USEFUL FOR CONTROLLED HEATING

FIELD OF THE INVENTION

The present invention relates to microwavable containers, and more particularly to microwavable containers with control elements having reflective and absorptive properties to provide crisp heating of foods.

BACKGROUND OF THE INVENTION

Non-conductive materials, such as paper, plastic and glass, are substantially microwave transparent as they neither reflect nor absorb microwaves. While containers for some food in these "transparent" materials are acceptable when the foods are heated, surfaces of foods heated in a microwave oven tend to become soggy due to condensation of water vapor on the food surface. This is a problem for foods that are desirably crisp such as fried chicken, french fries, pizza and the like. As a consequence, metallized polyester films have been developed as susceptors (thin films of a conductive material designed to absorb microwave energy) in order to heat food adjacent the metallized film area by conduction and radiation. The metallized area, because of its low heat mass, heats quickly and transfers the heat for browning and crisping. Thus, susceptors assist in heating food surfaces to prevent water vapor condensation and soggy food surfaces.

Thin coatings of aluminum on polyester film are known and used as such susceptors by adhesive lamination to paper or paperboard. However, aluminum oxidizes over time, thus losing its conductivity, and aluminum also continues to absorb microwave energy. This creates the possibility of overheating. Controlling the amount of metal deposited on the polyester is also difficult. The adhesive lamination can pose problems due to outgassing from the adhesive during heating which causes odors and undesirable tastes.

SUMMARY OF THE INVENTION

It is an object of the present invention to make microwave susceptor films that absorb and reflect on organic substrates, yet which maintain a temperature less than that of the organic substrate during normal microwave heating.

In one aspect of the present invention, a container useful in microwave heating of foods comprises a substrate with a titanium nitride film on at least a portion of the substrate. The substrate is substantially microwave transparent while the film is adapted to absorb microwave energy and thus become heated, and to transfer heat to foods when adjacent the film. A preferred substrate is crystallized polyethylene terephthalate, which has a melting point between about 198° C.-218° C. With titanium nitride films of the invention, containers can be heated in conventional microwave ovens (such as having an incident power of about 1600 watts at 2450 MHz) for crisp heating of foods, yet without causing tray melting.

BRIEF DESCRIPTION OF THE DRAWING

FIG. 1 is a perspective view of a container embodiment of the invention.

DETAILED DESCRIPTION OF THE PREFERRED EMBODIMENTS

Containers of the invention comprise a substrate that is substantially microwave transparent and has a determinable melting or scorching temperature. For example, substrates formed of crystallized polyethylene terephthalate (CPET) have a melting or scorching temperature between about 198° C.-218° C., while paper board and plastic/paper composite substrates typically have a heat resistance up to about 205° C. Such plastic, paper and composite substrates are suitable for use as substrates of the present invention, although CPET is particularly preferred due to an attractive, table-ready appearance. It should be understood, however, that a wide variety of relatively heat stable, but organic, substrates are suitable.

Turning to Fig. 1, a container 10, useful in microwave heating of foods, comprises substrate 12 (as has been described) with a titanium nitride film 14 on at least a portion of substrate 12. As illustrated, substrate 12 may be formed as a tray with a first food receiving cavity 16 and a second food receiving cavity 18. Film 14 may be adhered to the bottom 20 of cavity 16 so that when foods are placed within the cavity 16, then film 14 absorbs microwave energy, becomes heated, and transfers heat to the foods.

Bottom 20 can be substantially flat, as illustrated, or may be formed in various configurations (such as corrugations) to facilitate liquid separation from the foods as they cook, for decorative purposes or the like. If desired, the film 14 may be additionally coated onto wall 22 of food receiving cavity 16 (as shown in FIG. 1).

Film 14 will be quite thin, preferably on the order of about 75 to about 400 Å, most preferably about 100 to about 200 Å. As will be more fully described hereinafter, films can be chosen with significantly different film thickness, yet with similar absorptive or reflective properties.

The titanium nitride film is preferably deposited onto the selected substrate by a magnetron sputtering process where a titanium target is sputtered in an atmosphere that includes at least some nitrogen gas. Sputtering is a well-known technique for forming a layer of material on a substrate. Reactive sputtering is where one constituent is sputtered in the presence of a gas of another. When the material to be sputtered is an electrical conductor, a dc potential is used. When the material to be sputtered is an insulator, it is preferred to use an rf potential in order to eliminate the build-up of surface charges on the insulator and the resulting loss in accelerating potential. The sputtering rate can be greatly increased by confining the plasma to a region adjacent to the target. Such confinement intensifies the plasma and increases both the probability of gas atom-electron collisions and the probability that the ions thus formed will strike the cathode. By use of a magnetic field, the plasma can be confined to a region which is only slightly separated from the cathode. One such device is the planar magnetron sputtering cathode.

The stoichiometry of titanium nitride films of the invention can vary. Thus, the films may be represented as $TiN_x$, where x is between about 0.8 to about 1.3. Where, for example, the titanium target is sputtered in the presence of a gas that is all nitrogen, then x will be greater than 1, usually on the order of about 1.1 to about 1.3. Where the titanium target is sputtered in a gas mixture reduced in the amount of nitrogen (for example, to include an inert gas and nitrogen), then x will normally be less than 1. With for example, a gas mixture that is 70 wt. % argon and 30 wt. % nitrogen, then x will be about 0.8.

Films of the invention preferably have a sheet resistivity of between about 40 to about 1000 ohms/sq., more preferably from about 200 to 900 ohms/sq., and most preferably (for a CPET substrate) between about 500-800 ohms/sq. Table I illustrates data taken of titanium nitride films on CPET substrates with varying film thicknesses. The targets used were all titanium.

TABLE I

| Gas Composition During Sputtering | Sheet Resistivity (ohms/sq.) | Film Thickness (Å) | Percentage Absorbed Power | Final Temp. (°C.) |
|---|---|---|---|---|
| 100% $N_2$ | 586 | 162 | 15 | 200 |
| 100% $N_2$ | 635 | 104 | 9 | 207 |
| 70% Ar/30% $N_2$ | 565 | 109 | 16 | 218 |
| 70% Ar/30% $N_2$ | 640 | 93 | 14 | 201 |

The final temperature data of Table I was taken after six minutes exposure of the inventive containers in a 1600 W microwave oven set on high at 2450 MHz. The microwave absorption was measured at 2450 MHz and 0.1 mW incident power. As can be seen, the data of Table I shows that similar resistivities, absorbed power and final temperatures can be obtained with varying film thicknesses and different gas mixtures during the deposition process to vary stoichiometry.

The relationship between sheet resistivity, absorbed power, transmitted power, and reflected power is illustrated by the data of Table II, which was taken from titanium nitride films on a flat pane of glass.

TABLE II

| Gas Composition During Sputtering | Sheet Resistivity (ohms/sq.) | Percentage Absorbed Power | Percentage Transmitted Power | Percentage Reflected Power |
|---|---|---|---|---|
| 100% $N_2$ | 340 | 36 | 34 | 30 |
| 100% $N_2$ | 390 | 41 | 36 | 23 |
| 100% $N_2$ | 445 | 42 | 36 | 22 |
| 100% $N_2$ | 570 | 34 | 43 | 23 |
| 100% $N_2$ | 960 | 21 | 56 | 22 |
| Control Substrate (uncoated) | | 1 | 79 | 20 |

For the same film stoichiometry, lower sheet resistivities indicate thicker films while higher sheet resistivities indicate thinner films. As can be seen from the data of Table II, one can have comparable absorption with different film thicknesses (as seen by the 340 and 570 ohm/sq. values). While the data of Table II is for films coated onto flat planes of glass, analogous results and relationships are obtained with substrates of the invention.

Titanium nitride films of the invention are durable and provide rapid, uniform heating. Table III illustrates data showing film heating as a function of time from microwave heating. The heat produced was measured using infra-red thermography.

TABLE III

| Temperature (°C.) | Time (Seconds) |
|---|---|
| 140 | 10 |
| 157 | 20 |
| 158 | 30 |
| 156 | 40 |
| 155 | 50 |

TABLE III-continued

| Temperature (°C.) | Time (Seconds) |
|---|---|
| 156 | 60 |
| 155 | 70 |
| 156 | 80 |
| 152 | 90 |
| 155 | 100 |
| 154 | 110 |
| 155 | 120 |

The data of Table III shows the films can reach about 150°-160° C. in 20 seconds and substantially uniformly maintain that temperature. The substrates of Table III were CPET trays. For comparison, CPET trays were coated with stainless steel. The stainless steel coated trays reached only about 85° C. after 2 minutes heating.

Where containers of the invention define one food receiving cavity with a film of the invention and another cavity that is substantially microwave transparent, then the microwave transparent cavity should be masked during deposition of the film.

Dual cavity containers were prepared where one cavity was coated with titanium nitride and the other cavity was masked by nesting a conforming CPET component in the non-coated cavity. The depositions were uniform using this method of masking and were repeatable. Containers of the invention were then tested by placing on a sheet of 3 mm glass in a microwave oven and run for 45 seconds at high power. The containers were measured on the side next to the non-coated cavity as close to the bottom as possible. The data of Table IV illustrates the temperatures after 45 seconds, the film thicknesses and the sheet resistances. The containers had some evidence of melting on the upper edge, or lip, of the cavities. This slight edge melting can be eliminated by masking the top lip of the containers during deposition.

TABLE IV

| Temperature (°C.) | Thickness (Å) | Ohm/sq. |
|---|---|---|
| 93 | 100 | 738 |
| 127 | 154 | 670 |
| 143 | 162 | 586 |

EXAMPLE I

Example I specifically describes the preparation of preferred embodiment containers. The vacuum system used to deposit titanium nitride on CPET trays was an Airco Coating Technology G-series system (G-6), single-ended with two deposition zones each containing two planar magnetron cathodes.

The single-ended system has a mechanically pumped entry and exit lock which can be evacuated to 50 microns pressure. This is followed by the deposition zones which can be evacuated via diffusion pumps to $1 \times 10^{-6}$ torr. For deposition purposes, the deposition zones can be filled to the $1 \times 10^{-3}$ torr range with inert or reactive gases. Deposition occurs by conveying the substrate back and forth under the cathode until the desired film thickness is achieved. The coater uses Airco Coating Technology HRC-3000 cathodes capable of uniformly coating a maximum substrate size of 40"×60".

One coat zone was used with two titanium targets. The Ti was sputtered in 100% nitrogen using an MKS gas flow control system to regulate $N_2$ flow at 888 sccm for a sputtering pressure of $1.5 \times 10^{-3}$ torr. Two Ti cathodes were run at a constant power of 20 kW each. The conveyor line speed was 200" per minute. The coating was deposited in two passes under the cathode. Each deposition run was made with five trays on a 2'×3' glass carrier. A tray was placed in each corner and one in the middle. Two of these trays were used as test samples with a glass microscope slide placed in the tray. The slide was used to measure film thickness and sheet resistance.

The trays had two food receiving cavities. One of the cavities was intended for foods not desired to be crisp cooked (such as various vegetables). The second food receiving cavity was corrugated and was coated with the titanium nitride film on the corrugated bottom and along the surrounding wall. The one cavity intended for vegetables was masked by nesting another CPET vegetable cavity tray into the one cavity.

As may be seen by the data of Table V, containers coated within each run showed excellent sheet resistance uniformity and comparison between runs shows good reproducibility.

TABLE V

| Run # | Container | Ohm/sq. |
|---|---|---|
| 1 | a | 650 |
|  | b | 645 |
|  | c | 645 |
| 2 | a | 645 |
|  | b | 637 |
|  | c | 637 |
| 3 | a | 703 |
|  | b | 695 |
|  | c | 695 |
| 4 | a | 690 |
|  | b | 682 |
|  | c | 682 |
| 5 | a | 679 |
|  | b | 671 |
|  | c | 671 |
| 6 | a | 648 |
|  | b | 641 |
|  | c | 641 |
| 7 | a | 658 |
|  | b | 650 |
|  | c | 650 |
| 8 | a | 608 |
|  | b | 601 |
|  | c | 601 |
| 9 | a | 550 |
|  | b | 544 |
|  | c | 544 |
| 10 | a | 564 |
|  | b | 558 |
|  | c | 558 |
| 11 | a | 589 |
|  | b | 583 |
|  | c | 583 |
| 12 | a | 615 |

TABLE V-continued

| Run # | Container | Ohm/sq. |
|---|---|---|
|  | b | 608 |
|  | c | 608 |

Although the present invention has been described with reference to specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

It is claimed:

1. A container, useful in microwave heating of foods, comprising:
   a substrate being substantially microwave transparent and having a determinable melting or scorching temperature; and,
   a titanium nitride film on at least a portion of the substrate, the film being adapted to absorb microwave energy, to become heated and to transfer heat to foods when adjacent the film.

2. The container as in claim 1 wherein the film becomes heated to a temperature less than the substrate melting or scorching temperature when the container is exposed to microwave energy of up to about 1600 W at 2450 MHz for up to about 6 minutes.

3. The container as in claim 1 wherein the film has a sheet resistivity of between about 40 to about 1000 ohms/square.

4. The container as in claim 1 wherein the substrate is crystallized polyethylene terepthalate.

5. The container as in claim 1 wherein the film consists essentially of $TiN_x$ where x is between about 0.8 to about 1.3.

6. The container as in claim 1 wherein the film has a thickness between about 75 to about 400 Å.

7. A microwavable container comprising:
   a tray defining a food receiving cavity, the cavity having a thin film adhered thereto with a sheet resistivity of between about 200 to about 900 ohms/square, the film consisting essentially of a titanium nitride.

8. The container as in claim 7 wherein the food receiving cavity is formed of crystallized polyethylene terephthalate.

9. The container as in claim 7 wherein the tray defines a first and a second food receiving cavity, the thin film being adhered to the first cavity and adapted to transfer heat to foods when placed therein, the second cavity being substantially microwave transparent.

* * * * *